(12) United States Patent
Pisklak et al.

(10) Patent No.: US 11,332,654 B2
(45) Date of Patent: May 17, 2022

(54) WELL BORE SPACER AND EFFICIENCY FLUIDS COMPRISING GEOPOLYMERS

(71) Applicant: Halliburton Energy Services, Inc., Houston, TX (US)

(72) Inventors: Thomas Jason Pisklak, Cypress, TX (US); Juan Pablo Stacey, Quito (EC); Heloisa Helena Fabricio Fernandes, The Woodlands, TX (US); Ronnie Glen Morgan, Waurika, OK (US); James Robert Benkley, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/791,373

(22) Filed: Feb. 14, 2020

(65) Prior Publication Data
US 2021/0253930 A1    Aug. 19, 2021

(51) Int. Cl.
| | |
|---|---|
| C09K 8/40 | (2006.01) |
| C09K 8/14 | (2006.01) |
| E21B 33/13 | (2006.01) |
| C09K 8/42 | (2006.01) |
| C09K 8/16 | (2006.01) |

(52) U.S. Cl.
CPC .............. *C09K 8/40* (2013.01); *C09K 8/145* (2013.01); *C09K 8/16* (2013.01); *C09K 8/424* (2013.01); *C09K 8/426* (2013.01); *E21B 33/13* (2013.01)

(58) Field of Classification Search
CPC . C09K 8/40; C09K 8/42; C09K 8/424; C09K 8/426; C09K 8/145; C09K 8/16; E21B 33/13; Y10S 507/928
See application file for complete search history.

(56) References Cited

U.S. PATENT DOCUMENTS

| | | | |
|---|---|---|---|
| 4,780,266 A | * | 10/1988 | Jordan ................ G01N 23/222 |
| | | | 376/162 |
| 5,358,044 A | | 10/1994 | Hale et al. |
| 7,794,537 B2 | | 9/2010 | Barlet-Gouedard et al. |

(Continued)

FOREIGN PATENT DOCUMENTS

| | | |
|---|---|---|
| WO | 2014/100604 A1 | 6/2014 |
| WO | 2018/009199 A1 | 1/2018 |

OTHER PUBLICATIONS

International Search Report and Written Opinion issued in related PCT Application No. PCT/US2020/018560 dated Nov. 3, 2020, 18 pages.

(Continued)

*Primary Examiner* — Aiqun Liz
(74) *Attorney, Agent, or Firm* — Thomas Rooney; Baker Botts L.L.P.

(57) ABSTRACT

Methods and compositions including treatment fluids that include geopolymers for use in subterranean formations are provided. The methods of the present disclosure include introducing a treatment fluid including a geopolymer material into a wellbore penetrating at least a portion of a subterranean formation, wherein the geopolymer material includes an aluminosilicate source, a metal silicate source, an activator, and water; contacting a first fluid present in the wellbore with the treatment fluid; and allowing the treatment fluid to displace at least a portion of the first fluid from at least a portion of the wellbore.

12 Claims, 1 Drawing Sheet

(56) References Cited

U.S. PATENT DOCUMENTS

| | | |
|---|---|---|
| 7,846,250 B2 | 12/2010 | Barlet-Gouedard et al. |
| 8,360,145 B2 | 1/2013 | Kalman et al. |
| 8,535,437 B2 | 9/2013 | Pershikova et al. |
| 8,685,903 B2 | 4/2014 | Ravi et al. |
| 8,851,173 B2 | 10/2014 | Brothers et al. |
| 9,189,685 B2 | 11/2015 | Nosaka |
| 9,206,343 B2 | 12/2015 | Pershikova et al. |
| 9,206,345 B2 | 12/2015 | Weaver et al. |
| 9,222,010 B2 | 12/2015 | Porcherie et al. |
| 9,346,711 B2 | 5/2016 | Chatterji et al. |
| 9,394,202 B2 | 7/2016 | Porcherie et al. |
| 9,534,165 B2 | 1/2017 | Agapiou et al. |
| 10,266,746 B1 | 4/2019 | Rahman et al. |
| 10,457,601 B2 | 10/2019 | Thomas et al. |
| 10,876,042 B2 | 12/2020 | Qu et al. |
| 2008/0028994 A1 | 2/2008 | Barlet-Gouedard et al. |
| 2011/0073311 A1 | 3/2011 | Porcherie et al. |
| 2011/0284223 A1 | 11/2011 | Porcherie et al. |
| 2012/0241155 A1 | 9/2012 | Ali et al. |
| 2013/0266380 A1 | 10/2013 | Capron et al. |
| 2014/0048264 A1 | 2/2014 | Chatterji et al. |
| 2014/0076568 A1 | 3/2014 | McDonald et al. |
| 2014/0166285 A1 | 6/2014 | Santra et al. |
| 2014/0367103 A1* | 12/2014 | Michaux ............ C09K 8/40 166/292 |
| 2015/0299042 A1 | 10/2015 | Hesse et al. |
| 2015/0315875 A1* | 11/2015 | Chatterji ............ C04B 28/02 166/285 |
| 2016/0153274 A1 | 6/2016 | Hull et al. |
| 2017/0137322 A1 | 5/2017 | Seo |
| 2017/0137694 A1 | 5/2017 | van Oort et al. |
| 2017/0334779 A1 | 11/2017 | Gong et al. |
| 2018/0029937 A1 | 2/2018 | Kondralowicz et al. |
| 2019/0367797 A1 | 12/2019 | Morgan et al. |

OTHER PUBLICATIONS

Synthesis and Characterization of materials based on inorganic polymers of alumina and silica: sodium polysialate polymers. Int. J. Inorg. Mat., (2000), 2, 309-317.

Xu, H. Geoplymerisation of alumosilicate materials. Diss. PhD Thesis, University of Melbourne, 2002.

Tabereaux, Alton. "Addressing the Challenge of Bauxite Residue." Light Metal Age (Feb. 2019), 5 pages.

Mucsi, Gábor, and Mária Ambrus. "Raw materials for geopolymerisation." (2017), 8 pages.

Soroka, I., "Setting and hardening," Portland Cement Paste and Concrete (1979).

"Standard Test Methods for Time of Setting of Hydraulic Cement by Vicat Needle," ASTM International C191-19, American Association State Highway and Transportation Officials Standard, (Sep. 2021).

Ma, Siwei et al., "A Rheological Approach to Study the Eady-Age Hydration of Oil Well Cement: Effect of Temperature, Pressure and Nanoclay," Construction and Building Materials, 215:119-127 (Aug. 2019), at p. 123.

"Isolating Potential Flow Zones During Well Construction," American Petroleum Institute Standard 65-2, at 37-38, Second Edition, (Dec. 2010).

* cited by examiner

WELL BORE SPACER AND EFFICIENCY FLUIDS COMPRISING GEOPOLYMERS

BACKGROUND

The present disclosure relates to methods and compositions for use in subterranean formations.

Treatment fluids may be used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids may be used in, e.g., cementing, well drilling, completion, and stimulation operations. Examples of such treatment fluids include, inter alia, cementing fluids, completion fluids, drilling fluids, well cleanup fluids, workover fluids, conformance fluids, gravel pack fluids, acidizing fluids, fracturing fluids, spacer fluids, efficiency fluids, and the like.

Spacer fluids and/or efficiency fluids may be used in oil and gas wells to facilitate displacement efficiency when displacing multiple fluids in a well bore. The displacement efficiency may refer to the percent by volume of the first fluid that is removed by a second fluid, from a given wellbore confinement such as casings and annuli. For example, spacer fluids and/or efficiency fluids may be placed within a subterranean formation to physically separate incompatible fluids. Spacer fluids and/or efficiency fluids also may be placed between different drilling fluids during drilling-fluid change outs, or between a drilling fluid and a completion brine. Efficiency fluids may be capable of at least partially consolidating within a subterranean formation to, for example, at least partially plug one or more holes, cracks, or fissures within the subterranean formation or downhole equipment. Spacer fluids and/or efficiency fluids may be used in primary or remedial cementing operations to separate, inter alia, a drilling fluid from a cement composition that may be placed in an annulus between a casing string and the subterranean formation, or in the wellbore or inside a casing string, whether the cement composition is placed in the annulus in either the conventional or reverse-circulation direction. The cement composition may be intended, for example, to at least partially set in the annulus, supporting and positioning the casing string, and bonding to both the casing string and the formation to form a substantially impermeable barrier, or cement sheath, which facilitates zonal isolation. The cement composition also may at least partially set inside the casing or inside the wellbore. If the spacer fluid does not adequately displace the drilling fluid from the annulus, or the cement slurry does not adequately displace the spacer from the annulus, the cement composition may fail to bond to the casing string and/or the formation to the desired extent, or pockets of drilling fluid and/or spacer fluid may be left which could compromise the hydraulic isolation.

Spacer fluids and/or efficiency fluids may have certain characteristics that increase their effectiveness. For example, the spacer fluid may be compatible with the displaced fluid and the cement composition. This compatibility also may be present at downhole temperatures and pressures. In some instances, it is also desirable for the spacer fluid and/or efficiency fluid to leave surfaces in the well bore water wet, thus facilitating bonding with the cement composition. Rheology of the spacer fluid and/or efficiency fluid can also be important. A number of different rheological properties may be important in the design of a spacer fluid and/or efficiency fluid, including yield point, plastic viscosity, gel strength, and shear stress, among others. While rheology can be important in fluid design, certain spacer fluids and/or efficiency fluids may not have the desired rheology at downhole temperatures. For instance, certain spacer fluids and/or efficiency fluids may experience undesired thermal thinning at elevated temperatures. As a result, certain spacer fluids and/or efficiency fluids may not provide the desired displacement in some instances.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of a liquid material transitioning to a harder or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, cementing operations, completions operations, fracturing operations, gravel packing operations, acidizing operations, scale dissolution and removal, consolidation operations, and the like.

Without limiting the disclosure to any particular theory or mechanism, geopolymers can be formulated to exhibit highly thixotropic behavior. In certain embodiments, placement of a thixotropic geopolymer formulation can be readily done using conventional cementing and pumping equipment. In some embodiments, the geopolymer materials of the present disclosure may be used in a spacer fluid. In other embodiments, the geopolymer materials of the present disclosure may be used, alone or in combination with one or more particulate materials, in an efficiency fluid. In some embodiments, the geopolymer materials may increase Displacement Efficiency of a spacer fluid or efficiency fluid. As used herein, the term "Displacement Efficiency" refers to the volume fraction (by volume or by mass) of a first fluid that is replaced by a treatment fluid in a given volume of a well bore.

Among the many potential advantages to the methods and compositions of the present disclosure, only some of which are alluded to herein, the methods and compositions of the present disclosure may provide improved treatment fluids for use in subterranean formations. For example, in certain embodiments, the treatment fluids of the present disclosure may prevent fluid loss due to rapid gel strength buildup. Moreover, the treatment fluids of the present disclosure may be versatile and suitable for use in a variety of treatment applications and conditions, including, but not limited to conventional cementing, a reverse cementing process, and a top fill cementing process. Additionally, the methods and compositions of the present disclosure may be suitable for a wide range of temperatures, loss rates, water salinities, and fluid densities.

The present disclosure relates to methods and compositions for use in subterranean formations, and specifically, to treatment fluids including geopolymers and methods for use. The methods and systems of the present disclosure provide treatment fluids that may include one or more geopolymer materials. In certain embodiments, the geopolymer materials of the present disclosure may include an aluminosilicate source, a metal silicate source, an activator, and water. In one or more embodiments, the geopolymer material may react to form a geopolymer. A geopolymer may be described as an inorganic polymer that forms long-range, covalently bonded, non-crystalline networks. Geopolymers also may be described as a class of consolidatable materials which rely on the dissolution and subsequent condensation of aluminosilicate precursors to form a hardened mass. Geopolymers also may be referred to as polysialates. As used herein, the term "consolidatable material" refers to a material that is capable of at least partially forming a body of material that has a non-zero crush strength and/or non-zero shear bond strength and relatively low permeability.

The production of a geopolymer may be called geosynthesis. In some embodiments, geosynthesis may be a reaction process that may involve naturally occurring aluminosilicates. In some embodiments, geopolymers may be formed by chemical dissolution and subsequent re-condensation of various aluminosilicates and silicates to form a 3D-network or three-dimensional mineral polymer. In certain embodiments, geopolymers based on aluminosilicates may be designed as a poly(silate) (e.g., abbreviated form of poly(silicon-oxo-aluminate)). In one or more embodiments, the silate network may include silicate and aluminate tetrahedrals linked alternately by sharing all oxygens, with $Al^{3+}$ and $Si^{4+}$ in IV-fold coordination with oxygen. In certain embodiments, the geopolymer material may be present in the treatment fluid in any suitable concentration or loading. In some embodiments, the geopolymer may be present in an amount of about 4.0 pounds per gallon ("lbm/gal") to about 20.0 lbm/gal. In certain embodiments, the geopolymer material may be present in the treatment fluid in any suitable concentration or loading. In other embodiments, the geopolymer may be present in an amount of about 6.0 lbm/gal to about 16.0 lbm/gal. In still other embodiments, the geopolymer may be present in an amount of about 8.0 lbm/gal to about 14.0 lbm/gal.

Equation 1 below provides a geosynthesis reaction in accordance with certain embodiments of the present disclosure, which may not be representative of all geosynthesis reactions.

(1)

As depicted in Equation 1, in certain embodiments, aluminate, silicate, and metal hydroxide react to form the geopolymer. Further, in those embodiments, the metal hydroxide, MOH, may include group 1 and 2 hydroxides. In one or more embodiments, suitable metal hydroxides may include, but are not limited to, potassium hydroxide, sodium hydroxide, and calcium hydroxide. In Equation 1, the degree of polymerization is denoted by n and the atomic ratio of Si to Al is denoted by z.

Equation 2 below illustrates an embodiment wherein the metal ion may act as a counter ion to counterbalance the negative charge of the aluminum metal.

(2)

Figure 1:
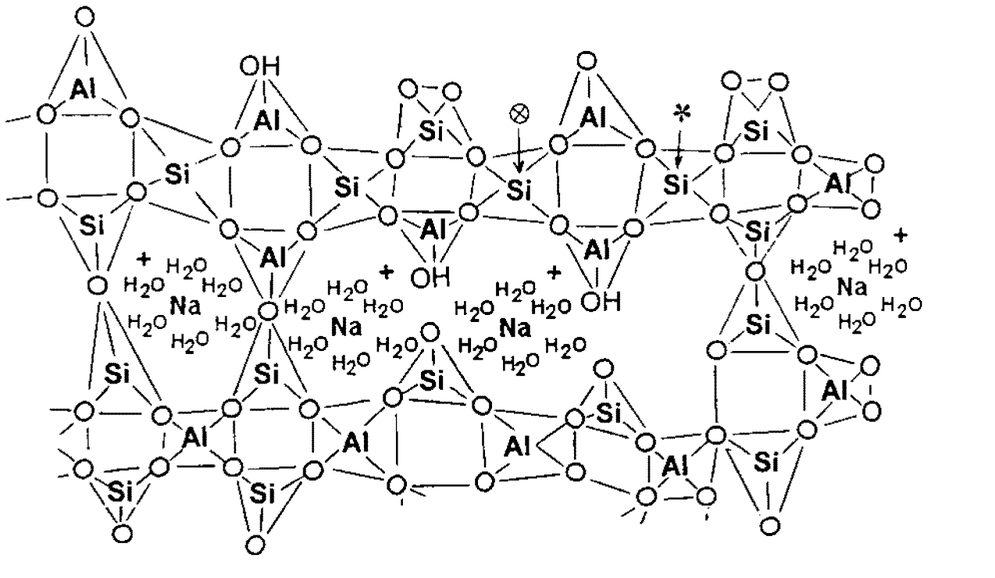
FIG. 1 is a diagram illustrating the molecular structure of a geopolymer material that may be used in accordance with certain embodiments of the present disclosure.

FIG. 1 illustrates a three-dimensional structure of one or more exemplary embodiments of a geopolymer in accordance with the methods and systems of the present disclosure. In one or more embodiments, the geosynthesis reaction may be kinetically favored due to the presence of the counter anion. In some embodiments, the metal hydroxide may act as an activator for the geosynthesis reaction and as a stabilizing agent to the final polymer matrix. In certain embodiments, other compounds may act as activators including, but not limited to, chloride salts such as KCl, CaCl, NaCl, carbonates such as $Na_2CO_3$, silicates such as sodium silicate, aluminates such as sodium aluminate, and ammonium hydroxide. In each case, the cation in the compound also may act as a counter anion. In some embodiments, a metal hydroxide and salt may be used together. In other embodiments, combinations of any salts, silicates, carbonates, aluminates, metal hydroxides, and ammonium hydroxide may act as an activator. In one or more embodiments, the activator may be dry mixed with the other components that may eventually react to form a geopolymer. A geopolymer lost circulation material of the present disclosure may include a mixture of such components and an activator. In some embodiments, the activator may be in an aqueous solution. In certain embodiments, the activator may be included in an amount in the range of from about 0.1% to about 50.0% by weight of the geopolymer material. In other embodiments, the activator may be included in an amount in the range of from about 1.0% to about 30.0% by weight of the geopolymer material. In still other embodiments, the activator may be included in an amount in the range of from about 5.0% to about 15.0% by weight of the geopolymer material.

The aluminosilicate source may include any suitable aluminosilicate. In certain embodiments, the aluminosilicate may be a mineral that includes aluminum, silicon, and oxygen, plus counter-cations. In one or more embodiments, the aluminosilicate source may be chosen based at least in part on the specific properties of the aluminosilicate. For example, some minerals such as andalusite, kyanite, and sillimanite are naturally occurring aluminosilicate sources that have the same composition, $Al_2SiO_5$, but differ in crystal structure. The differences in the crystal structure of the aluminosilicate may provide different properties. For example, each of andalusite, kyanite, or sillimanite may react more or less quickly and to different extents at the same temperature and pressure due to the differing crystal structures. In some embodiments, the final geopolymer created from any one aluminosilicate may have both microscopic and macroscopic differences such as mechanical strength and thermal resistivity owing to the different aluminosilicate sources. In some embodiments, the aluminosilicate source may include, but is not limited to, metakaolin clays, calcined clays, partially calcined clays, kaolinite clays, lateritic clays, illite clays, volcanic rocks, mine tailings, blast furnace slag, natural glass, agglomerated zeolite catalysts (e.g., FCC) and coal fly ash. In certain embodiments, the aluminosilicate source may be present in an amount in the range of from about 0.05% to about 50.0% by weight of the geopolymer material. In other embodiments, the aluminosilicate source may be present in an amount in the range of from about 1.0% to about 45.0% by weight of the geopolymer material. In still other embodiments, the aluminosilicate source may be present in an amount in the range of from about 1.75% to about 40.0% by weight of the geopolymer material.

The metal silicate source may include any suitable metal silicate. A silicate may be any compound containing an anionic silicon compound. In some embodiments, the silicate may include an orthosilicate anion also known as silicon tetroxide anion, $(SiO_4)^{4}$. In other embodiments, the silicate may include cyclic and single chain silicates that may have the general formula $(SiO_3^{2-})_n$ and sheet-forming silicates that may have the general formula $(Si_2O_5^{2-})_n$. In one or more embodiments, the silicate may have one or more metal cations associated with each silicate molecule. In some embodiments, suitable metal silicate sources and may include, but are not limited to, sodium silicate, magnesium silicate, and potassium silicate. In certain embodiments, the metal silicate source may be present in an amount in the range of from about 0.1% to about 50.0% by weight of the geopolymer cement composition. In other embodiments, the metal silicate source may be present in an amount in the range of from about 0.3% to about 40.0% by weight of the geopolymer cement composition. In still other embodiments, the metal silicate source may be present in an amount in the range of from about 0.6% to about 30.0% by weight of the geopolymer cement composition.

In one or more embodiments, the components of the geopolymer materials may be combined in any order desired to form a geopolymer material that can be placed into a subterranean formation or used as a component of a treatment fluid. In certain embodiments, the components of the geopolymer materials may be combined using any mixing device compatible with the composition, including a bulk mixer, for example. In some embodiments, a geopolymer material may be formed by dry blending dry components including the aluminosilicate source, the metal silicate source, and an activator. In one or more embodiments, the dry blend of the geopolymer material may then be combined with water (e.g., tap water, seawater, saltwater, etc.) to form a geopolymer slurry, which may be included in a treatment fluid. In other embodiments, a dry blend of the geopolymer material may be combined directly with other components of a treatment fluid to form said treatment fluid.

In certain embodiments, the treatment fluid may exhibit thixotropic properties or behavior. A thixotropic material is a material for which viscosity at least partially decreases over time when using a constant or increasing shear rate. As shear rate decreases, the viscosity at least partially increases over time and the material will gradually recover the original internal structure before shear. Shear rate may be increased, for example, by pumping the treatment fluid. Shear rate may be decreased, for example, by stopping, or reducing the rate of, the pumping of the treatment fluid or by a portion of the treatment fluid leaving the primary flow path of the pumped treatment fluid. Without being limited by theory, it is believed that in some embodiments a geopolymer may impart a thixotropic property to the treatment fluid. In some embodiments, the extent of a fluid's thixotropy may be measured by dial readings on a Fann viscometer at different rpm. In some embodiments, the dial readings on a Fann Yield Strength Adapter (FYSA) at 3 rpm may be substantially similar to the dial readings at 300 rpm for the treatment fluid at 127° F. (52.78° C.). In some embodiments, a geopolymer lost circulation material may be present in a sufficient amount to cause the treatment fluid to exhibit a thixotropic property at some point after a geopolymer is formed. In some embodiments, the treatment fluids of the present disclosure may exhibit a thixotropic rate of from about 0.50 (lbf/100 sq·ft.)/min to about 50.0 (lbf/100 sq·ft.)/min. In other embodiments, the treatment fluids of the present disclosure may exhibit a thixotropic rate of from about 20.0 (lbf/100 sq·ft.)/min to about 45.0 (lbf/100 sq·ft.)/min. In still other embodiments, the treatment fluids of the present disclosure may exhibit a thixotropic rate of from about 25.0 (lbf/100 sq·ft.)/min to about 40.0 (lbf/100 sq·ft.)/min.

As used herein, the term "thixotropic rate" refers to the rate at which gel strength increases after the fluid flow stops. One convenient method to quantify this "thixotropic rate" is to subtract the "10 sec gel reading" from the "10 minute gel reading" and divide by 9.83 minutes. Thixotropic rate or thixotropy may also refer the rate at which the gel strength increases with resting time. Gel strength may refer to the initial maximum torque reading on a viscometer when rotation is turned on, after allowing the fluid to rest in the viscometer for a given period of time. For example, gel strengths for drilling muds, spacers and cement slurries may be measured as follows using either a conventional bob/sleeve or FYSA viscometer configuration: (1) collect RPM vs torque readings for various RPM's such as, but not limited to: 3, 6, 30, 60, 100, 200, 300 and 600 RPM's; (2) collect data above during RAMP UP and RAMP DOWN sequence; (3) when reaching the last RPM (3 RPM) during the RAMP DOWN, record the torque at 3 RPM; (4) turn off the viscometer for 10 seconds, then turn on the viscometer and record the highest torque reading (which will be during the initial start up of rotation); (5) repeat step 4 with 10 minutes of rest; (6) repeat step 4 with 30 minutes of rest; and (7) gel strength should be expressed in (lbf/100 sq·ft.), which is obtained by multiplying the peak torque reading by the viscometers K2 coefficient that converts torque to shear stress in units of lbf/100 sq·ft. Thixotropic rate may be measured by any known method, including, but not limited to computing the difference between the gel strength at 10 minutes and the gel strength at 10 seconds, which man be defined as GS, 10 min–GS, 10 sec, then computing the thixotropic rate by dividing (GS, 10 min–GS, 10 sec) by 9.83 minutes, thus providing units of [(lbf/100 sq·ft.)/min]. Alternatively, the thixotropic rate may also be defined as the slope of the line generated by plotting time (in minutes) for each gel strength on the X-axis and gel strength (in units of lbf/100 sq·ft.) on the Y-axis.

In some embodiments, the treatment fluid may be a gellable fluid. As used herein, the term "gellable fluid" refers to a fluid that is capable of converting from a free flowing fluid into a semi-solid substance that has viscoelastic properties or that has a yield stress greater than 250 Pa. In certain embodiments, a gellable fluid may form a rubbery or elastic gel upon placement in or after entering a loss zone and may be characterized by an adjustable gel time ranging from nearly instantaneous to a few hours. In an embodiment, a gellable treatment fluid includes a fluid with little to no yield stress prior to gelling. In an embodiment, the gellable treatment fluid may have a gel time shorter than the time required to place the treatment fluid in the loss zone. In some embodiments, the treatment fluid may be gellable but not consolidatable.

In some embodiments, the treatment fluids of the present disclosure may include a weighting agent. Examples of suitable solid weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and any combination thereof. These weighting agents may be at least partially soluble or insoluble in the treatment fluid. In some embodiments, a weighting agent may be present in the treatment fluids in an amount of from about 1% to about 60% by weight of the treatment fluid. In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid. Alternatively, the amount of weighting agent may be expressed by weight of dry solids. For example, the weighting agent may be present in an amount of from about 1% to about 99% by weight of dry solids. In some embodiments, the weighting agent may be present in an amount of from about 1% to about 20% and, alternatively, from about 1% to about 10% by weight of dry solids.

Certain components of the treatment fluid may be provided as a "dry mix" to be combined with the base fluid and/or other components prior to or during introducing the treatment fluid into the subterranean formation. In some embodiments, dry mix compositions may be designed to include a base fluid in an amount from about 1 to about 25 gallons per 94-lb sack of dry blend (gal/sk). In certain embodiments, dry mix compositions may be suitable for base fluids in the amount of 10 gal/sk. In some embodiments, dry mix compositions may be suitable for base fluids in the amount of 13.5 gal/sk. Embodiments of the treatment fluids of the present disclosure may be prepared in accordance with any suitable technique. In some embodiments, the desired quantity of water may be introduced into a mixer (e.g., a cement blender) followed by the dry blend. The dry blend may include the geopolymer and additional solid additives, for example. Additional liquid additives, if any, may be added to the water as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present disclosure.

In some embodiments, the treatment fluids of the present disclosure may include a fluid loss control additive. In some embodiments, the amount of fluid loss control additive present in the treatment fluid is in a range of from about 0.01% by weight of the cement to about 5.0% by weight of the cement. In some embodiments, the treatment fluids may further include a lightweight additive. In one or more embodiments, the density of the treatment fluid may be adjusted to increase Displacement Efficiency. The lightweight additive may be included to reduce the density of embodiments of the treatment fluids. For example, the lightweight additive may be used to form a lightweight treatment fluid having a density of less than about 13 lbm/gal. The lightweight additive typically may have a specific gravity of less than about 2.0. Examples of suitable lightweight additives may include, but are not limited to sodium silicate, hollow microspheres, gilsonite, perlite, and any combinations thereof. An example of a sodium silicate suitable for certain embodiments of the present disclosure is ECONOLITE™ additive, available from Halliburton Energy Services, Inc. In certain embodiments, the lightweight additive may be present in an amount of from about 0.1% to about 20% by weight of dry solids. In certain embodiments, the lightweight additive may be present in an amount of from about 1% to about 10% by weight of dry solids.

In certain embodiments, the treatment fluids may include lime. In certain embodiments, the lime may be hydrated lime. In some embodiments, the lime may be present in an amount of from about 0.01% to about 5% by weight of cement. In certain embodiments, the lime may be present in an amount of at least 0.7% by weight of cement.

In certain embodiments, the treatment fluids of the present disclosure may include lost circulation materials or particulate bridging agents. In some embodiments, lost circulation materials may be included in the compositions as a secondary mechanism to cure the losses without altering the thixotropic behavior of the treatment fluid. In certain embodiments, lost circulation materials may include, but are not limited to, BridgeMaker II™ lost circulation material and Pol-E-Flake™ lost circulation material, available from Halliburton Energy Service, Inc., and PhenoSeal® lost circulation material, available from Phenomenal Brands. In certain embodiments, the treatment fluid does not include a lost circulation material. In certain embodiments, the treatment fluid does not include a bridging agent. In some embodiments, the treatment fluid is free or substantially free of particulates.

In certain embodiments, the treatment fluids of the present disclosure may be suitable for use at a variety of temperatures, pH levels, water salinities, and mineralogies of subterranean formations. In some embodiments, the materials that make up the treatment fluids compositions function at temperatures above 400° F. (204.4° C.) and thus the behavior of the compositions is likely to be unaffected at temperatures above 400° F. (204.4° C.). Thus, in certain embodiments, the treatment fluids may provide effective fluid displacement, loss zone treatment, or both, even when used in conditions at or above 400° F. (204.4° C.). Moreover, the properties of treatment fluids may be effective over a range of pH levels. For example, in certain embodiments, the treatment fluids may provide effective fluid displacement and loss zone treatment from a pH of about 7 to about 12.

In other embodiments, the treatment fluids may provide effective fluid displacement and loss zone treatment from a pH of about 10 to about 13.5. Additionally, the treatment fluids of the present disclosure may be suitable for a variety of subterranean formations, including, but not limited to shale formations and carbonate formations.

In some embodiments, the treatment fluids may include excess water that may induce undesirable characteristics in the treatment fluid. In certain embodiments, the treatment fluids may further include a free water control additive. As used herein, the term "free water control additive" refers to an additive included in a liquid for, among other things, reducing (or preventing) the presence of excess free water in the liquid. Free water control additives also may reduce (or prevent) the settling of solids. Examples of free water control additives suitable for certain embodiments of the present disclosure include, but are not limited to, bentonite, amorphous silica, hydroxyethyl cellulose, and combinations thereof. An example of a suitable free water control additive is SA-1015EXP™ suspending agent, available from Halliburton Energy Services, Inc. Another example of a suitable free water control additive is WG17™ solid additive, available from Halliburton Energy Services, Inc. The free water control additive may be provided as a dry solid in some embodiments. In certain embodiments, the free water control additive may be present in an amount of from about 0.1% to about 16% by weight of cement ("bwoc") in the treatment fluid. In some embodiments, the free water control additive may be present in an amount of from about 0.1% to about 2% bwoc. In certain embodiments, the free water control additive may be present in the treatment fluid in an amount from about 0.2 lbm/bbl to about 10 lbm/bbl.

In certain embodiments, one or more rheological properties of the treatment fluid may be adjusted to, for example, increase Displacement Efficiency. In some embodiments, the one or more rheological properties (e.g., viscosity, gel strength, etc.) may be increased. In other embodiments, the one or more rheological properties may be decreased. As used herein, "yield point" is the value obtained from the Bingham-Plastic rheological model when extrapolated to a shear rate of zero. As used herein, the "gel strength" of a treatment fluid is a measure of the suspending characteristics, or the thixotropic properties of a fluid, measured in pounds per 100 square feet (lbm/100 ft$^2$). Gel strength may be measured according to API RP 10B-2, Recommended Practice for Testing Well Cements, First Edition, July 2005. In some embodiments, the treatment fluid has a 10 second gel strength of at least 20 lbf/100 ft$^2$. In some embodiments, the treatment fluid has a 30 minute gel strength of about 40 lbf/100 ft$^2$ or greater. In some embodiments, the treatment fluid has a 60 minute gel strength of about 70 lbf/100 ft$^2$ or greater. In certain embodiments, a geopolymer is in a sufficient concentration such that the treatment fluid has a 10 second gel strength of about 20 lbf/100 ft$^2$ or greater, a 30 minute gel strength of about 40 lbf/100 ft$^2$ or greater, a 60 minute gel strength of about 70 lbf/100 ft$^2$ or greater, or a combination thereof. In some embodiments, if the gel strength values are too high or too low, the volume of the treatment fluid may be adjusted to bring the gel strength values into the desired range.

In some embodiments, the treatment fluids of the present disclosure may displace at least a portion of a first fluid present in the wellbore. The first fluid may be any type of treatment fluid or naturally-occurring fluid in a wellbore, including, but not limited to a drilling fluid, spacer fluid, completion fluid, cementing fluid (e.g., cementing slurries, wellbore cements, etc.), and the like. In one or more embodiments, the treatment fluids of the present disclosure may displace at least a portion of the first fluid present in a wellbore. In certain embodiments, the treatment fluids of the present disclosure may displace substantially all of the first fluid present in a wellbore. In some embodiments, the first fluid may be a drilling fluid. In some embodiments, a second treatment fluid of the present disclosure may be introduced into the wellbore to displace at least a portion of a first treatment fluid of the present disclosure present in the wellbore. In certain embodiments, the treatment fluid may separate a first fluid from a second fluid. For example, in some embodiments, the treatment fluid may separate a drilling fluid from a cementing fluid.

In primary well cementing operations, a cement slurry may be pumped into the annulus between a string of casing or other pipe disposed in the wellbore and the walls of the wellbore for the intended purpose of sealing the annulus, supporting the casing or pipe and protecting the casing or pipe from corrosive elements in the wellbore. Incomplete displacement of the drilling fluid before cementing may prevent the formation of an adequate bond between the cement and the casing/pipe or between the pipe/casing and the wellbore.

The removal of gelled drilling fluid and filter cake may be further complicated if the casing or other pipe to be cemented in a well bore is not centered in the well bore. The resulting eccentric annulus promotes fluid flow through the wide side of the annulus as a result of resistance to flow being less therein. Since a cement slurry often does not flow as readily through the narrow side of the annulus, not all of the drilling fluid in the annulus may be displaced by the slurry. Deviated wellbores often have eccentric annuli due to the difficulty in properly centralizing the casing or pipe prior to cementing.

In certain embodiments, the treatment fluids of the present disclosure may be effective at displacing a fluid in an eccentric annulus due to shear thinning properties of the spacer composition. For example, in some embodiments, there is equal resistance to flow in both narrow side and wider side of the casing-formation annulus because the variation in shear stress with shear rate is negligible. This would mean that in case of eccentric annulus, the treatment fluid will effectively displace the drilling fluid on both the wider side of the annulus but also on the narrow side of the annulus.

In certain embodiments, the treatment fluids of the present disclosure may be used to at least partially clean or wash one or more surfaces within a subterranean formation. In one or more embodiments, a surface of the subterranean formation or downhole equipment may become coated with particles or other undesirable buildup. In some embodiments, the treatment fluids may contact at least a portion of a surface of the subterranean formation. In one or more embodiments, the treatment fluid may at least partially remove one or more particles from the surface of the subterranean formation. In some embodiments, the treatment fluids may contact at least a portion of a surface of a piece of downhole equipment with the treatment fluid. In one or more embodiments, the treatment fluid may at least partially remove one or more particles from the surface of the downhole equipment.

In certain embodiments, the treatment fluids of the present disclosure may be capable of at least partially consolidating within a subterranean formation to at least partially plug one or more holes, cracks, or fissures within the subterranean formation or downhole equipment. In some embodiments, the treatment fluids of the present disclosure may at least partially displace a first fluid present in the wellbore and at least partially consolidate within a subterranean formation to at least partially plug one or more holes, cracks, or fissures within the subterranean formation or downhole equipment.

In some embodiments, the methods of the present disclose may include introducing at least a portion of the treatment fluid within a loss zone or other flow path through which the flow of fluids may be desirably reduced or ceased and causing or allowing the treatment fluid to gel. In some embodiments, the treatment fluid may be introduced to the wellbore to prevent the loss of aqueous or non-aqueous fluids into loss zones such as voids, vugular zones, perforations, and natural or induced fractures.

In some embodiments, the thixotropic properties of the treatment fluids of the present disclosure allow the treatment fluids to provide effective fluid displacement even in low equivalent circulating density ("ECD") applications. As used herein, "ECD" is the combined downhole pressure due to hydrostatic head and frictional loss during circulation, listed as density at the depth of interest. Low ECD may occur when the difference between pore pressure and fracture pressure at a given depth is small. In low ECD applications, there may be less tolerance to changes in hydrostatic or friction pressure while remaining within safe operating ranges of pore pressure and fracture pressure.

The compositions used in the methods of the present disclosure may include any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. The aqueous fluids may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In certain embodiments, the treatment fluids of the present disclosure optionally may include any number of additional additives. Examples of such additional additives include, but are not limited to, resins; latex; stabilizers; silica; pozzolans; microspheres; aqueous superabsorbers; viscosifying agents; suspending agents; dispersing agents; salts; accelerants; surfactants; retardants; foamers; defoamers; settling-prevention agents; weighting agents; fluid loss control agents; elastomers; vitrified shale; gas migration control additives; formation conditioning agents; and combinations thereof. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., cementing, drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation.

The methods and compositions of the present disclosure may directly or indirectly affect one or more components or pieces of equipment associated with the preparation, delivery, recapture, recycling, reuse, and/or disposal of the compositions of the present disclosure. For example, the methods and compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The methods and compositions of the present disclosure also may directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. The methods and compositions of the present disclosure also may directly or indirectly affect the various downhole equipment and tools that may come into contact with the fluids such as, but not limited to, wellbore casing, wellbore liner, completion string, insert strings, drill string, coiled tubing, slackline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps. In some embodiments, at least one of the first fluid and the second fluid are introduced into the wellbore using one or more pumps.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Example 1 illustrates that geopolymers based on spent fluid catalytic cracking ("FCC") catalysts can be used to form spacer fluids that do not consolidate under wellbore conditions. Two sample fluids comprising geopolymer materials were prepared according to the formulations in Table 1 using standard API cement mixing procedures.

TABLE 1

Formulations of spent FCC catalyst geopolymer spacer fluids.

| Material | Sample Fluid 1 Wt. (g) | Sample Fluid 2 Wt. (g) |
|---|---|---|
| Spent FCC Catalyst | 100.0 | 100.0 |
| Hydrated Lime | 4.0 | 4.0 |
| Sodium Silicate Solution | 122.4 | 42.9 |
| NaOH Solution | 111.8* | 39.5** |
| Water | 527.1 | 167.0 |
| Suspending Aid | 0.6 | 0.7 |
| Slurry Density (ppg) | 9.45 | 10.72 |

*5.3M NaOH solution
**5.9M NaOH solution

The rheology of each fluid sample was measured using a 6-speed Fann 35 viscometer to give the results in Table 2:

TABLE 2

Rheological values of non-consolidatable spent FCC catalyst geopolymer spacer fluids.

| Sample Fluid | Temp. (° F.) | Viscometer Reading (B&S) | | | | |
|---|---|---|---|---|---|---|
| | | 3 | 6 | 100 | 200 | 300 |
| 1 | 80 | 2 | 3 | 7 | 9 | 11 |
| | 130 | 1 | 2 | 3 | 6 | 7 |
| | 180 | 2 | 3 | 5 | 7 | 9 |
| 2 | 80 | 14 | 17 | 42 | 54 | 65 |
| | 130 | 17 | 22 | 53 | 69 | 84 |
| | 180 | 10 | 14 | 36 | 48 | 58 |

The rheological data in Table 2 were fit to the Generalized Herschel-Bulkley (GHB) viscosity model. The results were used to compute apparent viscosities ("AVIS") at three example shear rates: 10; 40 and 100 l/sec. The AVIS was determined by dividing the shear stress by the shear rate of a given set of GHB viscosity parameters that were obtained by best fitting conventional viscometer data. The results are provided in Table 3 below.

TABLE 3

Apparent viscosities of non-consolidatable spent FCC catalyst geopolymer spacer fluids.

| Sample | Density (ppg) | Temperature (F.) | AVIS at 10 l/sec (cP) | AVIS at 40 l/sec (cP) | AVIS at 100 l/sec (cP) |
|---|---|---|---|---|---|
| Fluid 1 | 9.45 | 80 | 529 | 275 | 187 |
| Fluid 1 | 9.45 | 130 | 544 | 297 | 209 |
| Fluid 1 | 9.45 | 180 | 188 | 58 | 30 |
| Fluid 2 | 10.72 | 80 | 4024 | 3178 | 2746 |
| Fluid 2 | 10.72 | 130 | 3971 | 3050 | 2600 |
| Fluid 2 | 10.72 | 180 | 4050 | 3236 | 2822 |

Example 2

Example 2 illustrates that geopolymers based on spent FCC catalysts can be formulated to function as efficiency fluids which consolidate under wellbore conditions. Two sample fluids were prepared according to the formulations in Table 4 using standard API cement mixing procedures.

TABLE 4

Formulations of spent FCC catalyst geopolymer efficiency fluids.

| Material | Sample Fluid 3 Wt. (g) | Sample Fluid 4 Wt. (g) |
|---|---|---|
| Spent FCC Catalyst | 100.0 | 100.0 |
| Hydrated Lime | 4.0 | 4.0 |
| Sodium Silicate Solution | 20.0 | 17.1 |
| NaOH | 18.2* | 15.3* |
| Suspending Aid | 0.30 | 0.18 |
| Water | 83.5 | 71.2 |
| Slurry Density (ppg) | 12.2 | 12.6 |

*5.5M NaOH solution

The rheology of each formulation was measured using a 6-speed Fann™ 35 viscometer to give the results in Table 5.

TABLE 5

Rheological values of consolidatable spent FCC catalyst geopolymer efficiency fluids.

| Sample Fluid | Temp. (° F.) | Viscometer Reading (B&S) | | | | |
|---|---|---|---|---|---|---|
| | | 3 | 6 | 100 | 200 | 300 |
| 3 | 80 | 35 | 49 | 138 | 203 | 265 |
| | 130 | 28 | 37 | 128 | 190 | 245 |
| | 180 | 18 | 24 | 90 | 128 | 163 |
| 4 | 80 | 75 | 93 | 285 | >300 | >300 |
| | 130 | 68 | 87 | 277 | >300 | >300 |
| | 180 | 78 | 95 | 281 | >300 | >300 |

The rheological data in Table 5 were fit to the Generalized Herschel-Bulkley viscosity model. The results were used to compute apparent viscosities at three example shear rates: 10; 40 and 100 l/sec. The results are provided in Table 6 below.

TABLE 6

Apparent viscosities for consolidatable spent FCC catalyst geopolymer efficiency fluids formulations.

| Sample | Density (ppg) | Temperature (F.) | AVIS at 10 l/sec (cP) | AVIS at 40 l/sec (cP) | AVIS at 100 l/sec (cP) |
|---|---|---|---|---|---|
| Fluid 3 | 12.20 | 80 | 3147 | 1913 | 1459 |
| Fluid 3 | 12.20 | 130 | 4049 | 3163 | 2747 |
| Fluid 3 | 12.20 | 180 | 4454 | 3706 | 3316 |
| Fluid 4 | 12.62 | 80 | 4694 | 1959 | 1153 |
| Fluid 4 | 12.62 | 130 | 4397 | 1895 | 1118 |
| Fluid 4 | 12.62 | 180 | 4809 | 1950 | 1136 |

After measuring the rheology, Sample Fluids 3 and 4 were cured in an Ultrasonic Cement Analyzer ("UCA") 24 hours at 200° F. (93.3° C.) and 3000 psi and thickening time to 70 Bc was measured in a HPHT consistometer at 200° F. (93.3° C.) and 3000 psi. As seen in Table 7 below, the results of both test methods indicate that these fluids would function as consolidatable spacers.

TABLE 7

Compressive strength for consolidatable spent FCC catalyst geopolymer efficiency fluids.

| Sample Fluid | Temp. (° F.) | UCA Compressive Strength | | | TT (hh:mm) |
|---|---|---|---|---|---|
| | | 50 psi (hh:mm) | 12 hrs (psi) | 24 hrs (psi) | |
| 3 | 200 | 11:51 | 55 | 231 | 3:23 |
| 4 | 200 | 6:26 | 460 | 746 | 3:06 |

Example 3

Example 3 illustrates that geopolymers based on metakaolin or other aluminosilicates can be formulated to function as spacers, which do not consolidate under wellbore conditions. Two geopolymer formulations were prepared according to the amounts in Table 8 below using standard API cement mixing procedures:

TABLE 8

Formulations of aluminosilicate geopolymer spacers.

| Material | Sample Fluid 5 Wt. (g) | Sample Fluid 6 Wt. (g) |
|---|---|---|
| Metakaolin | 100.0 | 40.0 |
| Volcanic Glass | — | 114 |
| Clay | — | 2.0 |
| Sodium Silicate Solution | 150.0 | 60 |
| NaOH (dry) | 6.0 | 2.4 |
| Water | 97.0 | 219.6 |
| Slurry Density (ppg) | 12.0 | 11.15 |

The rheology of each formulation was measured using a 6-speed Fann 35 viscometer to give the results in Table 9.

TABLE 9

Rheological values of aluminosilicate geopolymer spacer formulations.

| Sample Fluid | Temp. (° F.) | Viscometer Reading (B&S) | | | | | | |
|---|---|---|---|---|---|---|---|---|
| | | 3 | 6 | 30 | 60 | 100 | 200 | 300 |
| 5 | 80 | 1.1 | 1.9 | 3.3 | 5.2 | 7 | 12 | 16.9 |
| 6 | 80 | 29.2 | 39.8 | 55.3 | 77.1 | 99.6 | 111.6 | 274.6 |

The rheological data in Table 9 were fit to the Generalized Herschel-Bulkley viscosity model. The results were used to compute apparent viscosities at three example shear rates: 10; 40 and 100 l/sec. The results are provided in Table 10. Fluids 5 and 6 demonstrate the ability to lower density by less than 0.85 ppg, while increasing viscosities 5 to 7 fold.

TABLE 10

Apparent viscosities of aluminosilicate geopolymer spacer formulations.

| Sample | Density (ppg) | Temperature (F.) | AVIS at 10 1/sec (cP) | AVIS at 40 1/sec (cP) | AVIS at 100 1/sec (cP) |
|---|---|---|---|---|---|
| Fluid 5 | 12.00 | 80 | 221 | 110 | 80 |
| Fluid 6 | 11.15 | 80 | 1732 | 615 | 391 |

Example 4

Example 4 illustrates that geopolymers based on metakaolin or other aluminosilicates can be formulated to function as efficiency fluids which consolidate under wellbore conditions. Four geopolymer formulations were prepared according to the amounts in Table 11 below using standard API cement mixing procedures:

TABLE 11

Formulations of aluminosilicate geopolymer efficiency fluids.

| Material | Sample Fluid 7 Wt. (g) | Sample Fluid 8 Wt. (g) | Sample Fluid 9 Wt. (g) | Sample Fluid 10 Wt. (g) |
|---|---|---|---|---|
| Metakaolin | 100.0 | 100.0 | 100.0 | 100.0 |
| Volcanic Glass | — | — | — | 185.3 |
| Sodium Silicate Solution | 150.0 | 150.0 | 150.0 | 150 |
| NaOH | 6.0 | 6.0 | 6.0 | 3.9 |
| Water | 0.0 | 25.0 | 45.0 | 252.5 |
| Slurry Density (ppg) | 14.4 | 13.5 | 13.0 | 12.1 |

The rheology of each formulation was measured using a 6-speed Fann 35 viscometer to give the results in Table 12.

TABLE 12

Rheological values of aluminosilicate geopolymer efficiency fluid formulations.

| Sample Fluid | Temp. (° F.) | Viscometer Reading (B&S) | | | | | | |
|---|---|---|---|---|---|---|---|---|
| | | 3 | 6 | 30 | 60 | 100 | 200 | 300 |
| 7 | 80 | 39.1 | 52.3 | 148.1 | 263.1 | — | — | — |
| 8 | 80 | 15.1 | 18.4 | 38.6 | 67 | 102.3 | 189.2 | 274.6 |
| 9 | 80 | 3.3 | 4.2 | 7.2 | 12 | 17.7 | 33.5 | 48.2 |
| 10 | 80 | 20.1 | 29.2 | 39.8 | 55.3 | 77.1 | 99.6 | 111.6 |

The rheological data in Table 12 were fit to the Generalized Herschel-Bulkley viscosity model. The results were used to compute apparent viscosities at three example shear rates: 10; 40 and 100 l/sec. The results are provided in Table 13.

TABLE 13

Apparent viscosities of aluminosilicate geopolymer efficiency fluid formulations.

| Sample | Density (ppg) | Temperature (F.) | Tau, o (lbf/100 sq. ft.) | Mu, oo (cP) | m | n | AVIS at 10 1/sec (cP) | AVIS at 40 1/sec (cP) | AVIS at 100 1/sec (cP) |
|---|---|---|---|---|---|---|---|---|---|
| Fluid 7 | 14.40 | 80 | 25.6 | 1165 | 0.90 | 0.88 | 2651 | 1660 | 1421 |
| Fluid 8 | 13.50 | 80 | 12.8 | 269 | 1.00 | 0.98 | 900 | 431 | 334 |
| Fluid 9 | 13.00 | 80 | 3.11 | 45.2 | 1.00 | 1.00 | 195 | 83 | 60 |
| Fluid 10 | 12.10 | 80 | 17.6 | 101 | 1.00 | 0.57 | 1381 | 505 | 282 |

As can be seen in Table 13, adding enough water to reduce the slurry density from 14.4 to 13.5 yields better rheologies (Sample Fluid 8) that allow for more effective use as an efficiency fluid. Furthermore, the slurry density can easily be reduced by adding more water, as in Sample Fluids 9 and 10, and surprisingly the slurry remains stable down to at least 11.0 ppg without any added suspending aid.

One characteristic of efficiency fluids is that they consolidate to form solids or semi-solids under wellbore conditions. After measuring the rheology of Sample Fluids 7, 8, 9, and 10, the sample fluids were poured into 2"×4" cylindrical molds and placed into a 180° F. (82.2° C.) water bath at atmospheric pressure. After 72 hours the samples were removed from the water bath and examined to determine if consolidation had occurred. Sample Fluid 7 was set hard and Sample Fluids 8, 9, 10 had consolidated to form strong semi-solids.

Example 5

Example 5 illustrates that spacers and efficiency fluids comprising geopolymers can have a widely varied formulation in regards to not only the aluminosilicate source but also of the metal silicate and metal hydroxide content. Three sample fluids were prepared that contained a lower metal silicate/aluminosilicate and metal hydroxide/aluminosilicate ratios as shown in Table 14 below using standard API cement mixing procedures.

TABLE 14

Geopolymer fluid formulations with reduced sodium silicate and sodium hydroxide.

| Material | Sample Fluid 11 Wt. (g) | Sample Fluid 12 Wt. (g) | Sample Fluid 13 Wt. (g) |
|---|---|---|---|
| Metakaolin | 100.0 | 100.0 | 100.0 |
| Sodium Silicate Solution | 15.0 | 15.0 | 15.0 |
| NaOH | 0.6 | 0.6 | 0.6 |
| Water | 69.0 | 88.5 | 108.0 |
| Slurry Density (ppg) | 13.3 | 12.6 | 12.1 |

The rheology of each formulation after reacting to form a geopolymer was measured using RheoVADR (Variable Automated Digital Rheometer) with a bob and sleeve to give the results in Table 15.

TABLE 15

Rheological values of reduced sodium silicate and hydroxide geopolymer fluid formulations.

| Sample Fluid | Temp. (° F.) | Viscometer Reading (B&S) | | | | | | |
|---|---|---|---|---|---|---|---|---|
| | | 3 | 6 | 30 | 60 | 100 | 200 | 300 |
| 11 | 80 | 52.9 | 65.6 | 71.5 | 89.9 | 124.8 | 219.0 | — |
| 12 | 80 | 8.2 | 10.9 | 11.2 | 16.6 | 21.8 | 35 | 47.4 |
| 13 | 80 | 3.5 | 4.6 | 5.3 | 8.1 | 10.9 | 17.2 | 23.0 |

The rheological data in Table 15 were fit to the Generalized Herschel-Bulkley viscosity model. The results were used to compute apparent viscosities at three example shear rates: 10; 40 and 100 l/sec. The results are provided in Table 16.

TABLE 16

Apparent viscosities for reduced sodium silicate and hydroxide geopolymer fluid formulations.

| Sample | Density (ppg) | Temperature (F.) | AVIS at 10 1/sec (cP) | AVIS at 40 1/sec (cP) | AVIS at 100 1/sec (cP) |
|---|---|---|---|---|---|
| Fluid 11 | 13.30 | 80 | 2534 | 825 | 483 |
| Fluid 12 | 12.60 | 80 | 426 | 141 | 82 |
| Fluid 13 | 12.10 | 80 | 214 | 70 | 41 |

After measuring the rheology of Sample Fluids 11, 12, and 13 they were each poured into 2"×4" cylindrical molds and placed into a 180° F. (82.2° C.) water bath at atmospheric pressure. After 72 hours the samples were removed from the water bath and examined to determine if consolidation had occurred. Sample Fluids 11 and 12 had consolidated while Sample Fluid 13 had not. Even with less metal silicate and metal hydroxide than other geopolymer formulations, these results show that can still function well as spacers and efficiency fluids.

An embodiment of the present disclosure is a method that includes introducing a treatment fluid including a geopolymer material into a wellbore penetrating at least a portion of a subterranean formation, wherein the geopolymer material includes an aluminosilicate source, a metal silicate source, an activator, and water; contacting a first fluid present in the wellbore with the treatment fluid; and allowing the treatment fluid to displace at least a portion of the first fluid from at least a portion of the wellbore.

In one or more embodiments described in the preceding paragraph, the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, a spent FCC catalyst, any derivative thereof, and any combination thereof. In one or more embodiments described above, the metal silicate source is a sodium silicate. In one or more embodiments described above, the activator is sodium hydroxide. In one or more embodiments described above, the method further includes the step of allowing the treatment fluid to displace substantially all of the first fluid from the wellbore. In one or more embodiments described above, the method further includes the step of selecting one or more rheological properties of the treatment fluid based on one or more characteristics of the first fluid to increase a Displacement Efficiency of the treatment fluid. In one or more embodiments described above, the method further includes the steps of contacting at least a portion of a surface of the subterranean formation or a surface of a piece of downhole equipment with the treatment fluid; and at least partially removing one or more particles from the portion of the surface. In one or more embodiments described above, the method further includes the step of adjusting the density of the treatment fluid to increase the Displacement Efficiency of the treatment fluid. In one or more embodiments described above, the treatment fluid exhibits thixotropic behavior. In one or more embodiments described above, the treatment fluid is introduced into the wellbore using one or more pumps. In one or more embodiments described above, the method further includes the step of allowing the treatment fluid to at least partially consolidate in at least a portion of the subterranean formation. In one or more embodiments described above, the method further includes the step of introducing a second fluid into the wellbore to displace at least a portion of the treatment fluid from at least a portion of the wellbore, wherein the treatment fluid substantially separates the second fluid from the first fluid. In one or more embodiments described above, the first fluid is a drilling fluid and the second fluid is a cementing fluid.

Another embodiment of the present disclosure is a method that includes introducing a treatment fluid including a geopolymer material into a wellbore penetrating at least a portion of a subterranean formation, wherein the geopolymer material includes an aluminosilicate source, a metal silicate source, an activator, and water; contacting a first fluid present in the wellbore with the treatment fluid; allowing the treatment fluid to displace at least a portion of the first fluid from at least a portion of the wellbore; and allowing the treatment fluid to at least partially consolidate within the wellbore.

In one or more embodiments described in the preceding paragraph, the aluminosilicate source is selected from the group consisting of a spent FCC catalyst, a metakaolin clay, a calcined clay, a partially calcined clay, a kaolinite clay, a lateritic clay, an illite clay, a volcanic rock, a mine tailing, blast furnace slag, coal fly ash, any derivative thereof, and any combination thereof; the metal silicate source is a sodium silicate; and the activator is sodium hydroxide. In one or more embodiments described above, the metal silicate source is a sodium silicate. In one or more embodiments described above, the activator is sodium hydroxide. In one or more embodiments described above, the treatment fluid exhibits thixotropic behavior.

Another embodiment of the present disclosure is a method that includes introducing a treatment fluid including an aqueous base fluid and a geopolymer material into a wellbore penetrating at least a portion of a subterranean formation wherein the geopolymer material includes an aluminosilicate source, a metal silicate source, an activator, and water; and allowing the treatment fluid to displace at least a portion of a drilling fluid from at least a portion of the wellbore.

In one or more embodiments described in the preceding paragraph, the method further includes allowing the treatment fluid to at least partially plug a loss zone in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a treatment fluid comprising a geopolymer material into a wellbore penetrating at least a portion of a subterranean formation, wherein the geopolymer material comprises an aluminosilicate source, a metal silicate source, an activator, and water, wherein the geopolymer material forms a geopolymer having a poly(silicon-oxo-aluminate) structure, and wherein the geopolymer is present in the treatment fluid in an amount from about 4.0 pounds per gallon to about 20.0 pounds per gallon of the treatment fluid;
   contacting a drilling fluid present in the wellbore with the treatment fluid;
   allowing the treatment fluid to displace at least a portion of the drilling fluid from at least a portion of the wellbore; and
   introducing a cementing fluid into the wellbore to displace at least a portion of the treatment fluid from at least a portion of the wellbore, wherein the treatment fluid substantially separates the cementing fluid from the drilling fluid, and wherein the treatment fluid does not consolidate in the subterranean formation.

2. The method of claim 1, wherein the aluminosilicate source is selected from the group consisting of a metakaolin clay, a calcined clay, a partially calcined clay, a kaolinite clay, a lateritic clay, an illite clay, a volcanic rock, a mine tailing, blast furnace slag, coal fly ash, a spent FCC catalyst, any derivative thereof, and any combination thereof.

3. The method of claim 1, wherein the metal silicate source is a sodium silicate.

4. The method of claim 1, wherein the activator is sodium hydroxide.

5. The method of claim 1 further comprising allowing the treatment fluid to displace substantially all of the drilling fluid from the wellbore.

6. The method of claim 1 further comprising selecting one or more rheological properties of the treatment fluid based on one or more characteristics of the drilling fluid to increase a Displacement Efficiency of the treatment fluid.

7. The method of claim 1 further comprising:
   contacting at least a portion of a surface of the subterranean formation or a surface of a piece of downhole equipment with the treatment fluid; and
   at least partially removing one or more particles from the portion of the surface.

8. The method of claim 1 further comprising adjusting the density of the treatment fluid to increase the Displacement Efficiency of the treatment fluid.

9. The method of claim 1, wherein the treatment fluid exhibits thixotropic behavior.

10. The method of claim 1, wherein the treatment fluid is introduced into the wellbore using one or more pumps.

11. A method comprising:
    introducing a treatment fluid comprising an aqueous base fluid and a geopolymer material into a wellbore penetrating at least a portion of a subterranean formation wherein the geopolymer material comprises an aluminosilicate source, a metal silicate source, an activator, and water, wherein the geopolymer material forms a geopolymer having a poly(silicon-oxo-aluminate) structure, and wherein the geopolymer is present in the treatment fluid in an amount from about 4.0 pounds per gallon to about 20.0 pounds per gallon of the treatment fluid;
    allowing the treatment fluid to displace at least a portion of a drilling fluid from at least a portion of the wellbore; and
    introducing a cementing fluid into the wellbore to displace at least a portion of the treatment fluid from at least a portion of the wellbore, wherein the treatment fluid substantially separates the cementing fluid from the drilling fluid, and wherein the treatment fluid does not consolidate in the subterranean formation.

12. The method of claim 11 further comprising allowing the treatment fluid to displace substantially all of the drilling fluid from the wellbore.

* * * * *